United States Patent [19]

Small et al.

[11] Patent Number: 4,705,636
[45] Date of Patent: Nov. 10, 1987

[54] METHOD OF MAKING A COATING AND A PERMSELECTIVE MEMBRANE, IONIC POLYMER THEREFOR, AND PRODUCTS THEREOF

[75] Inventors: Hamish Small, Leland; Inder Mani, Midland, both of Mich.

[73] Assignee: The Dow Chemical Company, Midland, Mich.

[21] Appl. No.: 756,894

[22] Filed: Jul. 19, 1985

[51] Int. Cl.$^4$ .............................................. B01D 13/00
[52] U.S. Cl. .............................. 210/638; 210/500.35; 210/500.42; 417/245; 521/27
[58] Field of Search .............. 210/638, 500.34, 500.35, 210/500.27, 500.42; 417/245, 244; 521/27

[56] References Cited

U.S. PATENT DOCUMENTS

| | | | |
|---|---|---|---|
| 3,083,118 | 5/1963 | Bridgeford | 210/654 X |
| 3,510,418 | 7/1970 | Mizutani et al. | 210/500.42 |
| 3,647,086 | 1/1972 | Mizutani et al. | 210/500.42 |
| 3,808,305 | 4/1974 | Gregor | 210/500.42 |
| 3,852,224 | 12/1974 | Bridgeford | 210/490 |
| 3,945,927 | 3/1976 | Imai et al. | 210/500.42 |
| 4,125,462 | 11/1978 | Latty | 210/490 |
| 4,262,041 | 4/1981 | Eguchi et al. | 210/500.42 |
| 4,268,463 | 5/1981 | Aoyagi et al. | 210/500.35 X |
| 4,360,434 | 11/1982 | Kawaguchi et al. | 210/500.42 |
| 4,412,922 | 11/1983 | Mir | 210/500.35 X |

Primary Examiner—Frank Spear

[57] ABSTRACT

This invention relates to an ionic polymer, method for making a coating and a composite membrane therefrom and also relates to products derived from the disclosed methods and polymer. A new lipid-like permselective membrane is disclosed comprising an ultra-thin selective coating deposited on a non-selective but permeable substrate, which may be anionic or cationic, in hollow fiber, tubular or planar form. The method of preparation of the membrane comprises treating the permeable substrate with a solution of the ionic polymer. The polymer is the product of an aromatic monomer, acrylate and vinyl chloride quaternized with a tertiary amine in which at least one of the alkyl groups of the amine contain at least two carbon atoms. The polymer can also be the product of an aromatic monomer and acrylate and the polymer being partially sulfonated. The treatment produces an extremely thin coating that is held tenaciously by electrostatic forces and the hydrophobicity of the polymer determines its permeability. The membrane has improved flux and selectivity.

61 Claims, 3 Drawing Figures

EXCHANGE OF Na$^+$ AND NH$_3$ (NH$_4^+$) ACROSS A SULFONATED POLYETHYLENE UNTREATED COIL MEMBRANE

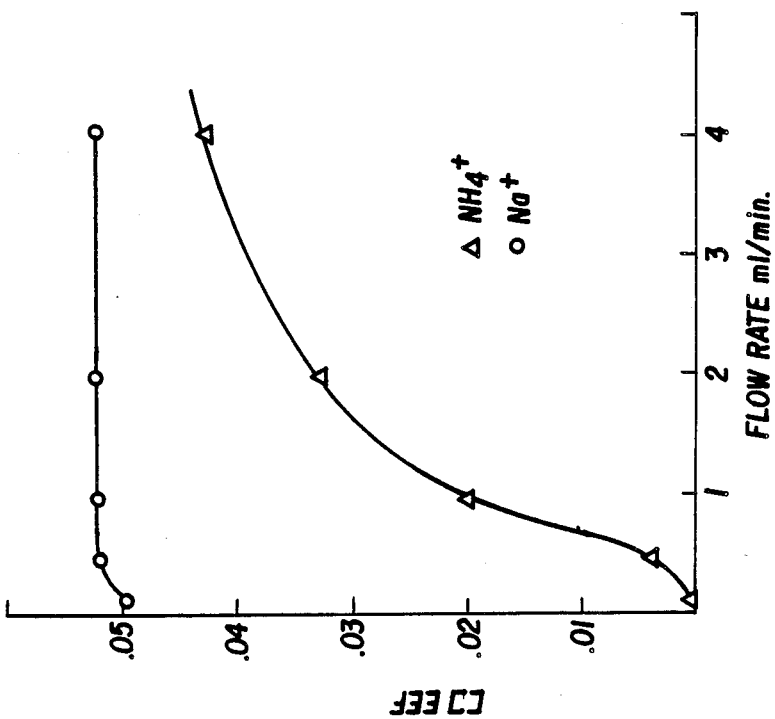
FIG. 2 EXCHANGE OF Na+ AND NH3 (NH4+) ACROSS A STYRENE/VINYL BENZYL QUATERNARY + (90:10) POLYMER TREATED COIL MEMBRANE AFTER WASHING INSIDE WITH TOLUENE BUTANOL
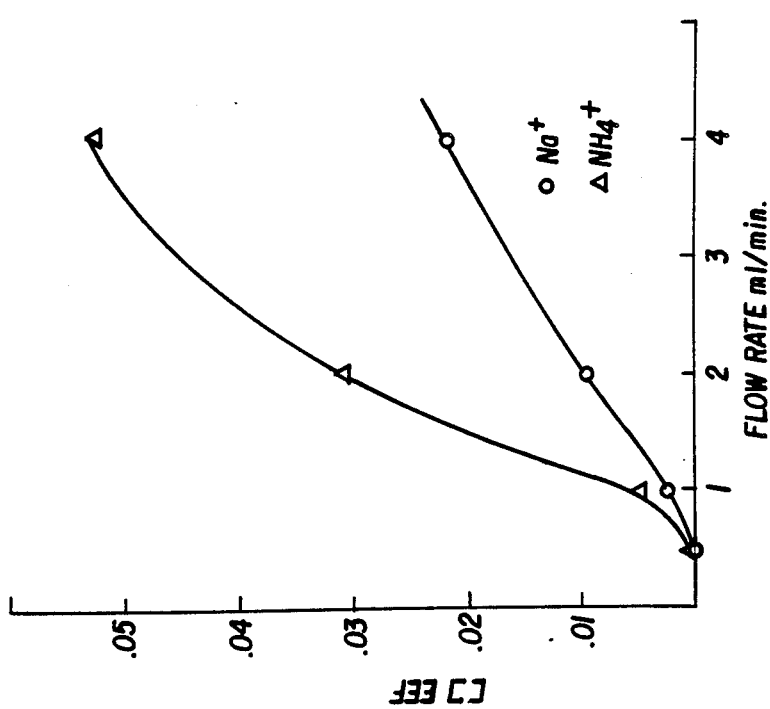
FIG. 1 EXCHANGE OF Na+ AND NH3 (NH4+) ACROSS A SULFONATED POLYETHYLENE UNTREATED COIL MEMBRANE

METHOD OF MAKING A COATING AND A PERMSELECTIVE MEMBRANE, IONIC POLYMER THEREFOR, AND PRODUCTS THEREOF

TECHNICAL FIELD

This invention relates to a polymer for making anionic and cationic coatings for use on oppositely charged substrates. Not only is the invention directed to this polymer and method for making a coating and a membrane, but is also directed to a coating and membrane product. The membrane product is useful in the separation of ammonia from salts, alcohols from brines or iodine from salt.

BACKGROUND

The present invention is directed to a polymer containing ionic functionality which produces an extremely thin, that is, ultra thin, coating which is preferably a surface coating layer or film. The prior art has failed to teach or suggest such a polymer or polymer coating, in particular, on an oppositely charged substrate, which can be used as a membrane. We have discovered that improved flux and selectivity characteristics are obtained with our membrane compared to known membranes. Unlike known membranes, our membrane is formed by coating a charged substrate with an oppositely charged polymer coating to form a substantially neutral interface between coating and substrate.

U.S. Pat. No. 3,083,118 to Bridgeford contains shotgun teachings concerning a polymer-modified material with anion and cation-exchange sites. This material is used to form thick, charged films. Monomers that are polymerized are, for example, styrene butyl acrylate and vinyl chloride. A multi-component catalyst system is used: $Fe^{++}/H_2O_2$. The reference further generally relates to monomers containing tertiary alkyl groups and alkyl amines used to make polymers containing ion-exchange groups. However, our invention is directed to a membrane product having an ultra thin coating layer which obtains improved selectivity and flux. These improved characteristics are not obtained using thick, charged films.

U.S. Pat. No. 3,647,086 contains disclosure relating to a cation-exchange membrane, where primary and secondary amines, including dodecylamine, are reacted with sulfonated polystyrene on a neutral substrate with subsequent conversion of free amine groups into acid amide bonds. However, this is not our invention.

Quaternizing a halogenated polystyrene with tertiary amine containing alkyl groups with twelve or more carbon atoms to form microporous or ion-exchange membranes is known, by U.S. Pat. Nos. 3,852,224 and 4,262,041, respectively.

It is also known to form ion-exchange membranes having a thickness of as small as 0.5 microns by dipping, coating or spraying a polymer on a substrate, by U.S. Pat. Nos. 3,510,418; 3,945,927 and 4,360,434. However, our invention relates to an ultra-thin coating layer, having a thickness substantially less than 0.5 micron, on a substrate to form a membrane having a substantially neutral interface between coating and substrate.

Composite membranes, formed by coating a porous substrate with a thin film, are known in the art by U.S. Pat. Nos. 3,808,305 and 4,125,462. Substrates include ultrafiltration, reverse osmosis or electrodialysis membranes or other conventional filtration materials.

As mentioned, the present invention relates to a polymer containing ionic functionality useful in forming an ultra-thin lipid layer which can be used to constitute a membrane, having a substantially neutral interface between coating and substrate. The polymer, method of using the polymer, and the coating and the membrane product thereof, having improved selectivity and flux characteristics, distinguish from the background art.

SUMMARY OF THE INVENTION

The present invention relates to a method for making a permselective membrane comprising polymerizing a mixture selected from aromatic monomer, acrylate and vinylbenzyl chloride, which polymer being quaternized with a tertiary amine containing alkyl groups having $C_1$ to $C_{20}$ carbon atoms, in which at least one alkyl group has at least two carbon atoms, and from aromatic monomer and acrylate, which polymer being partially sulfonated, and depositing the polymer on an oppositely charged, permeable substrate to form an ultra-thin coating thereon forming a permselective membrane having high flux and high selectivity.

The present invention relates to a method for making a permselective membrane comprising polymerizing a mixture of aromatic monomer, acrylate and vinylbenzyl chloride, quaternizing the polymer with a tertiary amine containing alkyl groups having $C_1$ to $C_{20}$ carbon atoms, in which at least one alkyl group has at least two carbon atoms, and depositing the quaternized polymer on an oppositely charged, permeable substrate to form an ultra-thin coating thereon forming a permselective membrane having high flux and high selectivity.

The invention further relates to a method for making a permselective lipid-like membrane for separating ammonia from salt, alcohol from brine or iodine from salt comprising polymerizing a mixture of styrene, butyl acrylate and vinylbenzyl chloride with a quaternary ammonium salt and ferric halide/hydrogen peroxide catalyst in deionized water to form a water insoluble polymer, quaternizing the polymer with dimethyldodecylamine and electrostatically depositing the quaternized polymer on the surface of an anionic, permeable substrate forming an ultra-thin coating thereon forming a permselective lipid-like membrane having high flux and high selectivity.

The invention further relates to a permselective membrane for fluid purification comprising a charged, ultra-thin coating of a polymer of aromatic monomer, acrylate and vinylbenzyl chloride quaternized with a tertiary amine containing alkyl groups having $C_1$ to $C_{20}$ carbon atoms, in which at least one alkyl group has at least two carbon atoms on an oppositely charged, permeable substrate forming a permselective membrane having high flux and high selectivity.

The invention also relates to a method for making an ultra-thin lipid coating comprising polymerizing a mixture of aromatic monomer, acrylate and vinylbenzyl chloride, quaternizing the polymer with a tertiary amine containing alkyl groups having $C_1$ to $C_{20}$ carbon atoms, in which at least one alkyl group has at least two carbon atoms, and forming an ultra-thin lipid coating.

The invention further relates to an ultra-thin lipid coating comprising a quaternized polymer of aromatic monomer, acrylate and vinylbenzyl chloride quaternized with a tertiary amine containing alkyl groups having $C_1$ to $C_{20}$ carbon atoms, in which at least one alkyl group has at least two carbon atoms.

The invention also relates to a polymer comprising aromatic monomer, acrylate and vinylbenzyl chloride quaternized with a tertiary amine containing alkyl groups having $C_1$ to $C_{20}$ carbon atoms, in which at least one alkyl group has at least two carbon atoms.

The present invention relates to a method for making a permselective membrane comprising polymerizing a mixture of aromatic monomer and acrylate and partially sulfonating the polymer and depositing the polymer on an oppositely charged, permeable substrate to form an ultra-thin coating thereon forming a permselective membrane having high flux and high selectivity.

The invention relates to a method for making a permselective lipid-like membrane for separating ammonia from salt, alcohol from brine or iodine from salt comprising polymerizing a mixture of styrene and butyl acrylate to form a water insoluble polymer, partially sulfonating the polymer and electrostatically depositing the polymer on the surface of a cationic, permeable substrate forming an ultra-thin film thereon forming a permselective lipid-like membrane having high flux and high selectivity.

The invention further relates to a permselective membrane for fluid purification, comprising a charged, ultra-thin coating of a sulfonated polymer of aromatic monomer and acrylate and partially sulfonating the polymer on an oppositely charged, permeable substrate forming a permselective membrane having high flux and high selectivity.

The invention also relates to a method for making an ultra-thin lipid coating comprising polymerizing a mixture of aromatic monomer and acrylate and partially sulfonating the polymer forming an ultra-thin lipid coating.

The invention further relates to an ultra-thin lipid coating comprising a sulfonated polymer of aromatic monomer and acrylate.

The invention relates to a polymer comprising aromatic monomer and acrylate and partially sulfonating the polymer.

DETAILED DISCLOSURE OF THE INVENTION

The invention relates to a new polymer, method for making an ultra-thin polymer coating and product thereof and also relates to a method for making a composite membrane and composite membrane product thereof. Thus, an ultra-thin, lipid-like fluid purification membrane can be fabricated utilizing the teachings of this invention. These membranes are prepared by treating an anionic or cationic substrate with an ionic polymer containing cation or anion functionality, respectively.

Cationic polymer is prepared by polymerizing the following reactants:
Aromatic monomer
Acrylate
Aromatic vinyl chloride
Quaternary ammonium salt
Ferric solution
Hydrogen chloride
Hydrogen peroxide
Mercaptoethanol
Water The reaction product of this polymerization is quaternized with a tertiary amine, for example, dimethyldodecyl amine. The resulting quaternized polymer can be used to form ultra-thin coatings to be coated on anionic substrates. The product can be used in fluid purification, for example, desalination and separation of ammonia from salt, alcohol from brine and iodine from salt.

The aromatic monomer can include styrene, vinyl toluene, t-butyl styrene and equivalent compounds known to those skilled in the art.

The acrylate reactant can include butyl, methyl, ethyl, ethyl hexyl acrylates, methylmethacrylate and other acrylates known to those skilled in the art.

The aromatic vinyl chloride reactant can include vinylbenzylchloride or other known vinyl chlorides.

The other reactants are conventional and optional. Equivalent reactants are known to those skilled in the art.

The amine reactant includes $(CH_3)_2R_1N$; $CH_3R_1R_2N$; $R_1R_2R_3N$; where $R_1$, $R_2$, $R_3 = C_1$ to $C_{20}$, except where $R_1 = R_2 = R_3 = C_1$, which is a methyl group. Thus, the amine compound can include, for example, dimethyldodecyl, dimethyldohexyl, triethyl and similar compounds.

All parts and percentages are by weight unless otherwise indicated.

Regarding the concentration of aromatic monomer in the reactant, the operating range is between about 0 and 99%, the preferred operating range being between about 0 and 95%. Regarding the concentration of the acrylate reactant, the operating range is between about 0 and 99%, the preferred operating range being between about 0 and 95%. Concerning the concentration of quaternary amine, the operating range is between about 1 and 50%, the preferred operating range being between about 5 and 40%.

The concentration of other components included in the reaction mixture used in the polymerization are conventional and known to those skilled in the art.

The polymerization reaction conditions are conventional to those skilled in the art, as well as the conditions for quaternization of the polymer. Techniques for depositing the quaternized polymer as an ultra-thin coating layer on an anionic substrate are also conventional to those skilled in the art and include dipping, coating and spraying.

Anionic polymer is prepared by polymerizing the following reactants:
Acrylate
Aromatic vinyl chloride
Anionic catalyst
Anionic surfactant
Mercaptaethanol
Water Polymerization is performed utilizing the above reactants in a conventional manner. Thereafter the polymer is coagulated, separated and dried. The polymer is then dissolved in a conventional solvent and partially sulfonated by adding a sulfonating agent.

The anionic coating is formed as described above for the cationic coating. Also, the cationic substrate is coated in the manner described above for the anionic substrates. Overall, this description is similar to and reference is made to the description of preparation of the cationic polymer for additional details about preparation of anionic polymer coating on a cationic substrate. There are, however, additional details.

The anionic catalyst can be sodium persulfate, potassium persulfate, ammonium persulfate or other equivalent catalysts.

The anionic surfactant can be sodium lauryl sulfate, dihexyl sodium sulfonate or other equivalent surfactants.

The concentrations of the catalyst and surfactant are conventional to those skilled in the art. The concentration of the sulfonating agent is between 1 and 25% and preferably between 5 and 20%.

Polymer useful in forming thin lipid coatings have an important biological function in controlling flux of water, salts and non-electrolytes into and out of cells. Ultra-thin lipid coatings are useful in a variety of engineering applications. The above-described polymer is useful in the preparation of a new type of lipid-like membrane. These new permselective membrane structures are prepared by depositing an ultra-thin selective layer on a relatively non-selective but permeable substrate. The substrate is anionic or cationic in preferably a hollow fiber or tubular form. Although, the form also can be planar. Treatment of at least one of the surfaces of the substrate with a solution of an ionic polymer containing anionic or cationic functionality produces a composite membrane with selective permeability. This treatment produces an extremely thin surface coating that is unexpectedly tenaciously held by electrostatic forces. The hydrophobicity of the polymer, which is controlled by its composition, determines the permeability of the composite membrane. While an unmodified membrane shows high permeability to hydrophilic ions such as $Na^+$, $Li^+$, $Ca^{2+}$, $H^+$ and the like, the new composite membrane is, in general, much less permeable to such ions. More particularly, such membranes show over three orders of magnitude less permeability. On the other hand, the thin barrier coating is still quite permeable to such less polar species as ammonia, alcohols and iodine. Therefore, the composite membranes of the present invention are able to make clean separations of, for example:

Ammonia from salt,
Alcohol from brine, and
Iodine from salt.

Other uses include separation of metal ions, organics from water, inorganics from water and salts, inorganics from organics, gases and the like. The present invention is advantageous over the prior art. The present technology provides an ultra-thin lipid coating easily. This coating has good flux, permeation and selectivity characteristics. Furthermore, the lipid-like surfaces can be easily rejuvenated. Rejuvenation can be accomplished by cleaning with water and contacting with polymer solution.

The substrate can be an anionic or cationic charged substrate. Anionic substrates can be, for example, sulfonated polyethylene, ion-exchange beads and the like. Conventional cationic substrates are used within the purview of this disclosure. Other equivalent substrates known to those skilled in the art can be conveniently utilized.

The ionic polymer coating of the present invention is deposited as an ultra-thin layer having a thickness from about 20 to about 300 A, preferably about 20 to about 100 A. One or more surfaces of the substrate can be coated or the entire substrate impregnated with the coating polymer of the present invention.

The membrane of this invention is advantageously formed into desired shapes by casting planar film of the membrane onto a suitable surface and removing solvent therefrom. The film may be, for example, flat, concave, convex, or in the form of hollow fibers, as previously mentioned.

The membrane has a minimum thickness such that it is essentially continuous, that is, there are essentially no pinholes or other leakages in it. It is preferable to prepare a membrane as thin as possible in order to maximize the permeation rate while insuring the integrity of the membrane. The thickness of the membrane is advantageously in the range from about 0.1 to about 250 microns, preferably from about 10 to about 50 microns. Mechanical strength can be imparted to the membrane by affixing the membrane to a porous supporting material.

Organic polymer coatings have been used to separate polar from non-polar species out of water. The separation derives from the preferential solubility of the non-polar species in the coating. However, the coatings are often times thick and flux rates are low. According to the present invention, the selective coating is extremely thin. The composite membrane shows high flux as well as high selectivity. The new technology provides an ultra-thin coating easily. It can be easily rejuvenated.

BRIEF DESCRIPTION OF FIGURES

Features of the present invention will be described in connection with the accompanying figures, which summarize the results of experimentation:

FIG. 1 shows exchange of sodium and ammonium ions across a sulfonated untreated polyethylene coil membrane;

FIG. 2 shows exchange of sodium and ammonium ions across a styrene quaternized vinylbenzyl polymer having cationic functionality in a 90/10 ratio treated coil membrane.

Figure 3:
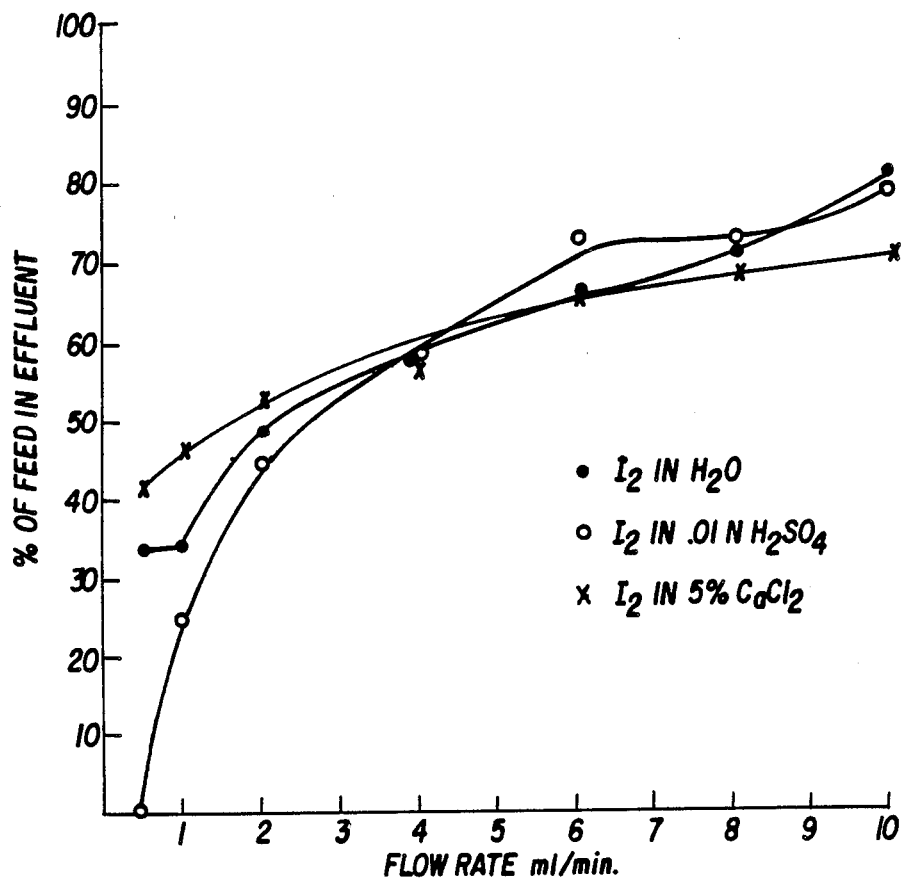
FIG. 3 shows percent of feed in the effluent versus flow rate for both treated and untreated coil membranes.

The following experiments illustrate the polymer, methods and products described above, and also illustrate the ease of formation of the ultra-thin lipid coatings, their good flux, permeation and selectivity and ease of rejuvenation. These experiments are merely illustrative and are not considered to limit the present invention.

PREPARATION OF POLYMERS

Example 1

Polymerization is carried out in a one liter, 5-necked flask fitted with a stirrer, $N_2$ inlet tube and a condenser. The following reaction mixture is used:

| Parts/<br>100 Parts Monomer | Material | To be Charged<br>(g) |
| --- | --- | --- |
| 363.5 | Deionized $H_2O$ | 290.8 |
| 14.0 | Trialkyl Quatenary ammonium salt (5% solution) | 11.2 |
| 50.0 | Butyl acrylate (50 mole %) | 40.0 |
| 23.2 | Styrene (28 mole %) | 18.6 |
| 26.8 | Vinylbenzyl chloride (22 mole %) | 21.4 |
| 5.0 | $Fe^{3+}$ solution (0.05%) | 4.0 |
| 5.0 | N/10 HCl | 4.0 |
| 10.0 | $H_2O_2$ (30% solution) | 8.0 |
| 2.5 | Mercaptoethanol | 2.0 |

All the ingredients, with the exception of H₂O₂ and mercaptoethanol, are loaded in the flask and stirred at 200 rpm while N₂ is bubbled into the mixture for 20 minutes. Heating is started, keeping a positive pressure of N₂ throughout the polymerization. When the temperature levels off at 65° C., the polymerization is continued for two hours. The latex is, then, cooled and filtered through a 325 mesh screen.

The above latex is then quaternized as follows: in a 32 oz. glass bottle, 100 g latex, 8 g dimethyldodecylamine and 172 g water are combined and agitated in a shaker for 4 hours and then kept overnight. After the reaction is complete, water is evaporated and final drying carried out in an oven at 105° C. The dried resin is dissolved in 50/50 toluene/t-butanol mixture to get a 3% solution.

Example 2

The polymer solution of Example 1 is then used to demonstrate its usefulness in making anionic surfaces hydrophobic. The hydrogen form of DOWEX 50W×8 (30–50 mesh) is washed with deionized water several times in a Buchner funnel and the moist resin stored in a bottle. DOWEX is a trademark for a series of synthetic ion-exchange resins made from styrene-divinylbenzene copolymers, having a large number of ionizable or functional groups attached to this hydrocarbon matrix. One gram of this resin is contacted with a dilute solution of the polymer in an organic solvent, sucked dry and washed several times with distilled water. The coated beads are then put in a beaker containing 100 g deionized water and stirred with a magnetic stirring bar. Ten grams of 1M NaCl are added and a stopwatch started simultaneously. An exchange reaction between Na⁺ (derived from NaCl) and H⁺ (derived from the resin) takes place. This fractional $Na^+$-$H^+$ exchange is determined as a function of time by titrating the released H⁺ with 0.1M NaOH. Half-time ($t_{\frac{1}{2}}$) for the exchange reaction is determined by plotting milliequivalents (meq) of NaOH versus time in minutes. The half time is determined to be 900 minutes. In a control experiment, uncoated beads give a half time of only 0.7 minutes. Thus, the ultra-thin layer is several orders of magnitude effective in slowing down $Na^+$-$H^+$ exchange.

Example 3

In the manner of Example 1, several quaternary polymers are prepared and tested as in Example 2. Polystyrene is also included as a control.

| Styrene (mole %) | Butylacrylate (%) | Quaternary Amine (%) | $t_{\frac{1}{2}}$, (minutes) |
| --- | --- | --- | --- |
| Control (uncoated beads) | | | 0.7 |
| 100 | 0 | 0 | 1.5 |
| 70 | 0 | 30.0 | 80–100 |
| 80 | 0 | 20.0 | 80–100 |
| 90 | 0 | 10.0 | 80–100 |
| 16.5 | 60.8 | 22.7 | 1400–1600 |
| 30 | 60 | 10.0 | 500–600 |

Example 4

Several quaternary polymers are prepared, but quaternized with triethylamine and tested.

| Styrene (mole %) | Quaternary Amine (%) | $t_{\frac{1}{2}}$ (minutes) |
| --- | --- | --- |
| Control (uncoated beads) | | 0.7 |
| 95 | 5 | 11.0 |
| 90 | 10 | 22.0 |
| 80 | 20 | 38.0 |

PREPARATION AND TESTING OF COMPOSITE MEMBRANE UTILIZING IONIC POLYMERS

Demonstrating Effect of Surface Modification

About 50" of polyethylene intramedic tubing PE 50 (0.023" ID; 0.038 OD) is wound onto a spindle and sulfonated in a solution of chlorosulfonic acid in methylene chloride to a capacity of about 1.5 meq/g.

The membrane is then placed in a stirred bath of N/10 HCl and N/10 NaCl pumped down the fiber, thus causing Na⁺ to exchange for H⁺ across the membrane. The effluent is collected and the hydrogen ion content measured by filtration. At a flow rate of 0.46 mls/min, the [H⁺] in the effluent is 0.055N.

The inside of the tubing is then treated with a solution of a styrene/vinylbenzyl quaternary (90:10) and the Na⁺/H⁺ exchange experiment is repeated. The [H⁺] in the effluent is only 0.004N, indicating the marked effectiveness of the surface treatment.

Composite Membrane as a Means of Separating Na⁺ and NH₄⁺

A sulfonated coil is pumped with a mixture of NaOH and NH₄OH with HCl in the external bath. The concentrations of Na⁺ and NH₄⁺ in the effluent as a function of flow rate are determined (FIG. 1). The membrane passes Na⁺ preferentially. The inner surface of the membrane is then treated with styrene/vinylbenzyl quaternary⁺ (90:10) polymer, as previously described, and the membrane exchange experiment repeated. The results are illustrated in FIG. 2, where it is clear that the membrane is now allowing ammonia to pass while very effectively blocking the flux of sodium.

Extraction of Iodine

A composite membrane prepared by treating the inner surface of a coil of NAFION, a trademark for a perfluorosulfonic acid membrane, with a styrene/butylacrylate/vinylbenzl quaternary polymer is fed with a solution of molecular iodine while the coil is immersed in a bath of 1N NaOH. The treated coil effectively blocked both the leakage of salts into the caustic bath and of NaOH into the iodine feed while permitting extraction of iodine into the bath (FIG. 3).

An untreated coil, however, is ineffective in transporting I₂ into the bath. Rather, sodium hydroxide leaks into the feed side, causing the I₂ to disproportionate to anionic species I⁻ and IO₃⁻ which are effectively blocked by the cation-exchange membrane.

This experiment demonstrates the utility of these composite membranes as a means of extracting and concentrating iodine. They are superior in flux, compared to a totally organic membrane such as polyethylene.

Example 5

The preceding experiments were repeated utilizing a polyvinylbenzyl trimethyl ammonium chloride cationic polymer. The result shows that this polymer did not possess the required high flux rates nor high selectivity characteristics of the amphiphilic polymer of the present invention.

It is not intended to limit the present invention to specific embodiments described above. It is recognized that other changes may be made in the formulation and methods of application and product thereof specifically described herein without deviating from the scope and teachings of the present invention. It is intended to encompass all other embodiments, alternatives and modifications consistent with the present invention.

We claim:

1. A method for making a permselective membrane comprising polymerizing a mixture with aromatic monomer, acrylate and vinylbenzyl chloride, which polymer being quaternized with tertiary amine containing alkyl groups having $C_1$ to $C_{20}$ carbon atoms, in which at least one alkyl group has at least two carbon atoms, or aromatic monomer, acrylate and vinylbenzyl chloride, which polymer being partially sulfonated, and depositing the polymer on an oppositely charged, permeable substrate to form an ultra-thin coating thereon forming a permselective membrane having high flux and high selectivity.

2. A method for making a permselective membrane comprising polymerizing a mixture of aromatic monomer, acrylate and vinylbenzyl chloride, quaternizing the polymer with a tertiary amine containing alkyl groups having $C_1$ to $C_{20}$ carbon atoms, in which at least one alkyl group has at least two carbon atoms, and depositing the quaternized polymer on an oppositely charged, permeable substrate to form an ultra-thin coating thereon forming a permselective membrane having high flux and high selectivity.

3. The method according to claim 2, further comprising the substrate being anionic.

4. The method according to claim 2, further comprising the substrate being a planar shape, tubular shape or a hollow fiber.

5. The method according to claim 2, further comprising the polymer containing cationic functionality.

6. The method according to claim 2, further comprising the membrane being essentially impermeable to the hydrophilic ions of Na, Li, Ca, H or the like.

7. The method according to claim 2, further comprising polymerizing in the presence of a cationic surfactant.

8. The method according to claim 7, further comprising the cationic surfactant being a quaternary ammonium salt.

9. The method according to claim 2, further comprising polymerizing in the presence of a catalyst.

10. The method according to claim 9, further comprising the catalyst being hydrogen peroxide.

11. The method according to claim 9, further comprising the catalyst being iron halide and hydrogen peroxide.

12. The method according to claim 11, further comprising the iron halide being a ferric halide.

13. The method according to claim 2, further comprising adding a chain transfer agent.

14. The method according to claim 13, further comprising adding mercaptoethanol as the chain transfer agent to the polymerization mixture.

15. The method according to claim 2, further comprising the acrylate being butyl, methyl, ethyl or ethyl hexyl acrylate.

16. The method according to claim 2, further comprising the tertiary amine being $(CH_3)_2R_1N$; $CH_3R_1R_2N$; $R_1R_2R_3N$; where $R_1$, $R_2$, $R_3 = C_1$ to $C_{20}$, except where $R_1 = R_2 = R_3 = C_1$.

17. The method according to claim 2, further comprising the tertiary amine being dimethydodecyl amine.

18. The method according to claim 2, further comprising the aromatic monomer being styrene.

19. The method according to claim 18, further comprising the styrene being vinyl toluene, t-butylstyrene, or methylmethacrylate.

20. The method according to claim 2, further comprising the polymer being deposited on at least one surface of the substrate.

21. The method according to claim 2, further comprising the concentration of aromatic monomer being between about greater than 0 and 99%, the concentration of acrylate being between about greater than 0 and 99%, and the concentration of quaternary amine being between about 1 and 50%.

22. The method according to claim 2, further comprising the concentration of aromatic monomer being between about greater than 0 and 95%, the concentration of acrylate being between about greater than 0 and 95%, and the concentration of quaternary amine being between about 5 and 40%.

23. The method according to claim 2, further comprising the substrate being carboxylated or sulfonated polyethylene.

24. The method according to claim 2, further comprising polymerizing in the presence of deionized water.

25. A method for making a permselective lipid-like membrane for separating ammonia from salt, alcohol from brine or iodine from salt comprising polymerizing a mixture of styrene, butyl acrylate and vinylbenzyl chloride with a quaternary ammonium salt and ferric halide/hydrogen peroxide catalyst in deionized water to form a water insoluble polymer, quaternizing the polymer with dimethyldodecylamine and electrostatically depositing the quaternized polymer on the surface of an anionic, permeable substrate forming an ultra-thin coating thereon forming a permselective lipid-like membrane having high flux and high selectivity.

26. A permselective membrane for fluid purification, comprising a charged, ultra-thin coating of a polymer of aromatic monomer, acrylate and vinylbenzyl chloride quaternized with a tertiary amine containing alkyl groups having $C_1$ to $C_{20}$ carbon atoms, in which at least one alkyl group has at least two carbon atoms on an oppositely charged, permeable substrate forming a permselective membrane having high flux and high selectivity.

27. The membrane according to claim 26, further comprising a rejuvenated membrane.

28. The permselective membrane of claim 26, wherein the thickness of the ultra-thin coating is between about 20 A and about 300 A.

29. A method for making an ultra-thin lipid coating comprising polymerizing a mixture of aromatic monomer, acrylate and vinylbenzyl chloride, quaternizing the polymer with a tertiary amine containing alkyl groups having $C_1$ to $C_{20}$ carbon atoms, in which at least one alkyl group has at least two carbon atoms, and forming an ultra-thin lipid coating.

30. The lipid coating of claim 29, wherein the thickness of the ultra-thin coating is between about 20 A and about 300 A.

31. An ultra-thin lipid coating comprising a quaternized polymer of aromatic monomer, acrylate and vinylbenzyl chloride quaternized with a tertiary amine containing alkyl groups having $C_1$ to $C_{20}$ carbon atoms, in which at least one alkyl group has at least two carbon atoms.

32. The lipid coating of claim 31, wherein the thickness of the ultra-thin coating is between about 20 A and about 300 A.

33. A polymer comprising an aromatic monomer, acrylate and vinylbenzyl chloride quaternized with a tertiary amine containing alkyl groups having $C_1$ to $C_{20}$ carbon atoms, in which at least one alkyl group has at least two carbon atoms.

34. A method for making a permselective membrane comprising polymerizing a mixture of aromatic monomer, acrylate and aromatic vinyl chloride and partially sulfonating the polymer and depositing the polymer on an oppositely charged, permeable substrate to form an ultra-thin coating thereon forming a permselective membrane having high flux and high selectivity.

35. The method according to claim 34, further comprising the substrate being cationic.

36. The method according to claim 34, further comprising sulfonating with chlorosulfonic acid.

37. The method according to claim 34, further comprising the substrate being a planar shape, tubular shape or a hollow fiber.

38. The method according to claim 34, further comprising the polymer containing anionic functionality.

39. The method according to claim 34, further comprising the membrane being essentially impermeable in the hydrophilic ions of Na, Li, Ca, H or the like.

40. The method according to claim 34, further comprising polymerizing in the presence of an anionic surfactant.

41. The method according to claim 34, further comprising polymerizing in the presence of a catalyst.

42. The method according to claim 41, further comprising the catalyst being sodium persulfate.

43. The method according to claim 34, further comprising adding a chain transfer agent.

44. The method according to claim 43, further comprising adding mercaptoethanol as the chain transfer agent to the polymerization mixture.

45. The method according to claim 34, further comprising the acrylate being butyl, methyl, ethyl or ethyl hexyl acrylate.

46. The method according to claim 34, further comprising aromatic monomer being styrene.

47. The method according to claim 46, further comprising the styrene being vinyl toluene, t-butylstyrene, or methylmethacrylate.

48. The method according to claim 34, further comprising the polymer being deposited on at least one surface of the substrate.

49. The method according to claim 34, further comprising the concentration of aromatic monomer being between about greater than 0 and 99% and the concentration of acrylate being between about greater than 0 and 99% and the concentration of sulfonating agent being between about 1 and 25%.

50. The method according to claim 34, further comprising the concentration of aromatic monomer being between about greater than 0 and 95%, the concentration of acrylate being between about greater than 0 and 95%, and the concentration of sulfonating agent being between about 5 and 20%.

51. The method according to claim 34, further comprising polymerizing in the presence of deionized water.

52. A method for making a permselective lipid-like membrane comprising polymerizing a mixture of styrene, butyl acrylate and aromatic vinyl chloride to form a water insoluble polymer, and electrostatically depositing the polymer on the surface of a cationic, permeable substrate forming an ultra-thin film thereon forming a permselective lipid-like membrane having high flux and high selectivity.

53. A permselective membrane, comprising a charged, ultra-thin coating for a sulfonated polymer of aromatic monomer, acrylate, and aromatic vinyl chloride and partially sulfonating the polymer on an oppositely charged, permeable substrate forming a permselective membrane having high flux and high selectivity.

54. The membrane according to claim 53, further comprising a rejuvenated membrane.

55. The permselective membrane of claim 53, wherein the thickness of the ultra-thin coating is between about 20 A and about 300 A.

56. A method for making an ultra-thin lipid coating comprising polymerizing a mixture of aromatic monomer, acrylate and aromatic vinyl chloride and partially sulfonating the polymer forming an ultra-thin lipid coating.

57. The lipid coating of claim 56, wherein the thickness of the ultra-thin coating is between about 20 A and about 300 A.

58. An ultra-thin lipid coating comprising a sulfonated or partially sulfonated polymer of aromatic monomer, acrylate and aromatic vinyl chloride.

59. The lipid coating of claim 58, wherein the thickness of the ultra-thin coating is between about 20 A and about 300 A.

60. A sulfonated or partially sulfonated polymer comprising aromatic monomer, acrylate and aromatic vinyl chloride.

61. A method for separating ammonia from salt, alcohol from brine or iodine from salt comprising passing a fluid containing such materials through a perselective membrane having a charged, ultra-thin coating of a polymer of aromatic monomer, acrylate and aromatic vinyl chloride quaternized with a tertiary amine containing alkyl groups having $C_1$ to $C_{20}$ carbon atoms, in which at least one alkyl group has at least two carbon atoms on an oppositely charged, permeable substrate forming the perselective membrane.

* * * * *